United States Patent [19]

deMey, II

[11] Patent Number: 4,871,142

[45] Date of Patent: Oct. 3, 1989

[54] MOUNTING SYSTEM FOR VIBRATION ISOLATION

[75] Inventor: Charles F. deMey, II, West Redding, Conn.

[73] Assignee: The Perkin-Elmer Corporation, Norwalk, Conn.

[21] Appl. No.: 292,759

[22] Filed: Jan. 3, 1989

[51] Int. Cl.$^4$ ............................................ F16M 13/00
[52] U.S. Cl. ................................... 248/632; 248/634; 248/638
[58] Field of Search ............... 248/632, 560, 605, 634, 248/635, 638; 267/293, 153

[56] References Cited

U.S. PATENT DOCUMENTS

| | | | |
|---|---|---|---|
| 1,948,193 | 2/1934 | Thompson | 248/635 |
| 2,072,244 | 3/1937 | Coursen | 248/632 |
| 2,549,768 | 4/1951 | Bradley | 248/632 X |
| 3,542,322 | 11/1970 | Dvorin | 248/632 |
| 4,067,525 | 1/1978 | Allen | 248/632 |
| 4,461,446 | 7/1984 | Hannibal et al. | 248/638 X |
| 4,647,245 | 3/1987 | Konsevich | 248/632 X |
| 4,690,960 | 9/1987 | Yamauchi et al. | 248/638 X |

Primary Examiner—Ramon O. Ramirez

Attorney, Agent, or Firm—H. S. Ingham; E. T. Grimes

[57] ABSTRACT

A mounting system includes a carriage member section of an apparatus being isolated from external vibrations, and a bench member having three support assemblies thereon to support the apparatus. Each support assembly comprises an upwardly oriented pin affixed to the bench member, and an elastomer isolating ring with a central hole press fitted onto the pin. The carriage member has an aperture therein aligned with each support assembly. The aperture is shaped as a slot portion superimposed centrally on a circular hole portion press fitted over the isolating ring. The isolating ring thereby is retained in compression between the pin and the outer wall such that elastomer overfill of the isolating ring can expand into the slot portion sufficiently to compensate for tolerance misalignment between the support member and the aperture, without substantial thickening of the isolating ring. A clamping assembly with an elastomer isolation pad holds the carriage onto three upward protrusions over each support assembly. A clamping assembly with an elastomer isolation pad holds the carriage onto three upward protrusions over each support assembly.

14 Claims, 2 Drawing Sheets

MOUNTING SYSTEM FOR VIBRATION ISOLATION

The present invention relates to a mounting system for isolating an apparatus from external vibrations.

BACKGROUND OF THE INVENTION

A common problem is to isolate an apparatus from external sources of vibration, including building vibrations and acoustical noise such as loud talking, hand claps and whistles. For example, in an optical apparatus such as an interferometer, noise may be intercepted by the optical bench and transferred to the interferometer where it changes the scan mirror speed, thus interfering with the gathering of information.

Rubber mounts are used typically for vibration isolators, but conventional rubber mounting systems allow too much freedom of movement to dampen vibrations and maintain optical alignment. Holding a rubber isolator such as an isolator ring in horizontal compression reduces such freedom of movement. However, rubber acts as an incompressible fluid and, therefore, thickens under such compression. Such thickening is somewhat uncontrollable and results in uneven heights of the several mounts required for support, thus tilting the apparatus.

A further problem is misalignment evolving from the normal tolerances of fabrication of the support bench and the carriage for the apparatus. Conventional slots for mounting pins can allow for adapting to variations within broad tolerances. However, even conventional cylindrical rubber pins forced into slots in compression may not sufficiently resist vibrational motion.

SUMMARY OF THE INVENTION

Therefore, objects of the present invention are to provide a novel mounting system for isolating an apparatus from external vibrations, to provide such a mounting system that is self compensating for tolerance misalignment, and to provide a mounting system utilizing elastomer isolation mounts in compression without substantial thickening of the isolation mounts.

The foregoing and other objects are achieved by a mounting system that includes a carriage member section of an apparatus being isolated from external vibrations, and a bench member having at least one, and preferably three support assemblies thereon positioned to support the carriage member and thereby the apparatus. Each support assembly comprises an upwardly oriented pin affixed to the bench member and an elastomer isolating ring with a central hole press fitted onto the pin.

The carriage member has at least one aperture therein, each being generally aligned with a corresponding support assembly. The aperture has a slot portion and a ring engagement portion. The ring engagement portion is defined by an outer wall which is press fitted over the isolating ring with the slot portion being unfilled by the isolating ring. The isolating ring thereby is retained in compression between the pin and the outer wall such that elastomer overfill of the isolating ring can expand into the slot portion sufficiently to compensate for tolerance misalignment between the support member and the aperture, without substantial thickening of the isolating ring.

In a preferred embodiment, the aperture is shaped as a slot portion formed as two diametrically opposite legs superimposed centrally on a portion of a circular hole, the hole portion being defined by the outer wall. The hole portion has a diameter dimension transverse to the slot portion, and the slot portion has a width less than the hole dimension and a length greater than the hole dimension.

In a further embodiment each of three support assemblies is positioned to support one third of the weight of the apparatus. With the apparatus having a center of mass defining a location of a vertical axis, the support assemblies with their corresponding apertures are equally spaced arcuately about the vertical axis. The slots each should have a longitudinal axis aligned on a radius extending from the vertical axis.

A clamping assembly is disposed proximate the vertical axis, comprising the carriage member having a first central hole therein and a respective upward protrusion on the carriage member located over each support assembly. A disk member is disposed on the respective protrusions and has a second central hole therein aligned with the first central hole. An elastomer isolation pad has a third central hole therein and is retained on the disk member with a third hole aligned with the first and second holes. A clampdown screw extends through the first, second and third holes without contacting the disk member or the carriage member, engaging the bench member such as to retain the pad and the disk member in compression.

DETAILED DESCRIPTION OF THE INVENTION

Figure 1:
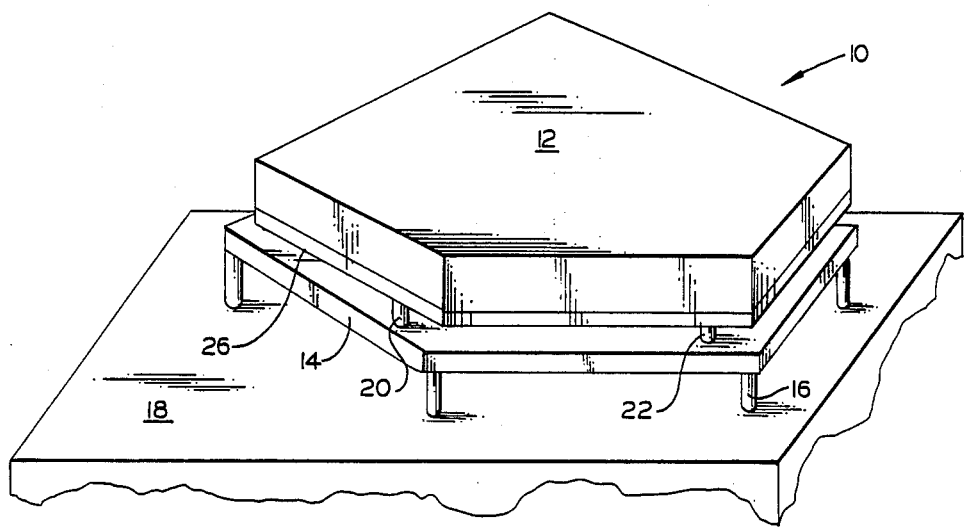
FIG. 1 is a perspective view of a system incorporating the present invention.

FIG. 1 shows generally a system 10 incorporating the present invention. An apparatus 12 such as an optical interferometer system is mounted on a bench member 14, e.g. an optical bench, which may have supporting members 16 for resting on a table 18. A mounting system including support assemblies 20,22 (two visible) provides mounting support of apparatus 12 on bench 14. Connection of the apparatus to the support assemblies is by way of a section of the apparatus, typically the bottom section, designated herein as a carriage member 26.

Figure 2:
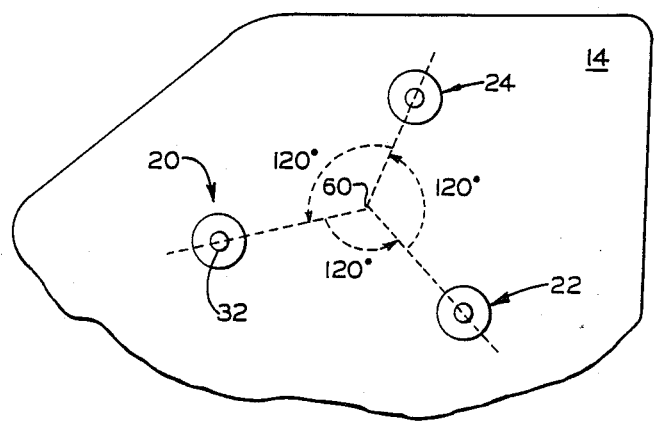
FIG. 2 is a plan view of a bench member portion of the system of FIG. 1.

FIG. 2 is a top view of bench member 14 and three support assemblies 20,22,24. Details of a support assembly 20 are shown further in FIG. 3. The support assembly may include a boss 28 protruding upwardly from bench member 14, the boss having an upwardly facing horizontal surface 30. An upwardly oriented pin 32 with a diameter less than that of the boss is centrally affixed to the boss, generally perpendicular to the bench. The pin may be machined from the same stock as bench 14, as shown, or may be threaded or otherwise affixed in a hole in the boss.

An elastomer isolating ring 34 formed of urethane rubber, silicone or the like has a central hole 36 therein press fitted onto pin 32 so that the isolating ring rests on upper surface 30 of boss 28. The isolating ring, preferably circular, has a thickness of about one third to one half of its diameter, and the central hole has a diameter comparable to the thickness of the ring. However these dimensions are not critical to the present invention, and more generally are such that the isolating ring will function a described herein.

Figure 4:
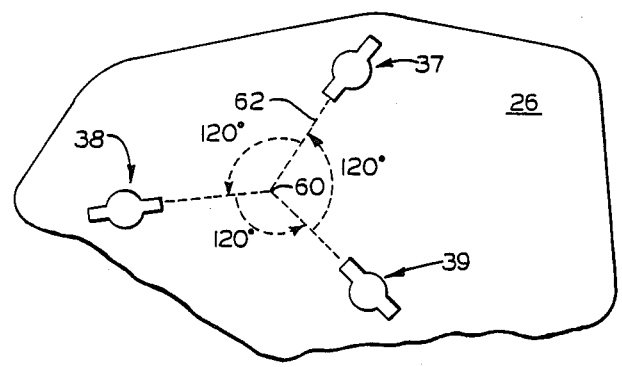
FIG. 4 is a bottom view of a carriage member with apertures therein according to the present invention.
Figure 5:
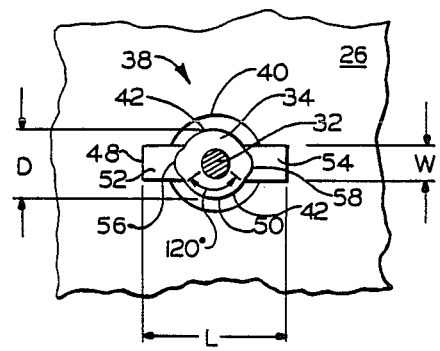
FIG. 5 is a detail of an aperture of FIG. 4.

FIG. 4 is a bottom view of carriage 26 showing apertures 37,38,39 therein receptive of assemblies 20,22,24 (FIG. 2) and generally aligned therewith. Reference also is made to FIG. 5 showing a small section of the bottom view of carriage 26 and an aperture 38 with isolating ring 34 therein, also illustrated with pin 32 in place. A protrusion 40 from the carriage containing the aperture provides spacing of the carriage from bench 14 if required. The aperture is formed with an outer wall 42 in two sections that are press fitted over isolating ring 34. A downwardly facing surface 44 (FIG. 3) at the bottom of aperture 38 in carriage member 26 provides further support for isolating ring 34. An indentation 46 at the bottom of the aperture provides space for the end of pin 32 so that support is truly by way of ring 34 and not on pin 32.

Figure 3:
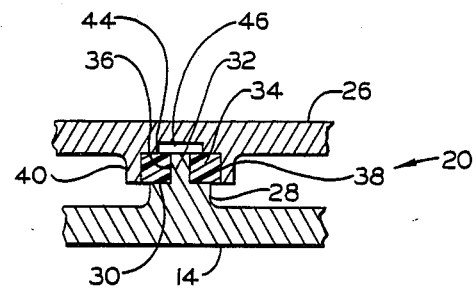
FIG. 3 is an elevation in cross section of a mounting system according to the present invention.

According to the present invention, and as illustrated in FIGS. 4 and 5, aperture 38 is shaped as a slot portion 48 superimposed centrally on a hole portion 50. The hole portion is defined by outer wall 42 of the aperture that is press fitted over isolating ring 34, and constitutes a ring engagement portion of the aperture. Hole portion 50 has a hole dimension D, e.g. a hole diameter in the case of the circular ring depicted, transverse to slot portion 48. The slot portion has a width W less than hole dimension D and a length L greater than hole dimension D. The slot portion preferably is formed as two legs 52,54 extending diametrically opposite each other from the hole portion. The slot may be slightly deeper than the hole portion to provide indentation 46 (FIG. 3). A feature of the present invention is that the slot portion is not filled by isolating ring 34.

Isolating ring 34 thereby is retained in compression between pin 32 and outer wall 42 of the hole portion such that any elastomer overfill (i.e., bulge) of the isolating ring can expand into the slot portion, as indicated at 56,58 (FIG. 5). The expansion of the compressed elastomer is thus effected without substantial vertical thickening of the isolating ring. Generally such thickening should be less than 1% of the ring thickness. Further, the expansion may be greater into one or the other leg of the slot portion sufficiently to compensate for tolerance misalignment between the support assembly and the aperture as explained further below.

The isolating ring and the corresponding hole portion are preferably and conveniently circular. However, within the present invention the ring and hole alternatively may be square or diamond shaped or the like. The hole dimension in any event, as defined herein, is the maximum dimension of the hole transverse to the slot portion. The hole dimension is preferably greater than the width of the slot. Other configurations may be practical; for example the aperture simply may consist of a slot, in which case the isolating ring may be square or rectangular such as to allow a press fit into the slot. However, a round ring is not quite satisfactory for a simple slot with straight sides, because even the press fit of a round ring in the rectangular slot, leaving slot legs for overfill, does not necessarily isolate vibrational motion or restrain position, either in the direction of the slot or transverse thereto. As an example of another alternative of the invention, there is a narrowing of the slot in the middle, and an "H" shaped ring is press fitted into the slot, with a hole in the center of the "H" for the pin.

However, as stated, a simple round ring is preferable. In a highly successful mounting system the hole portion is circular and is defined by an outer wall extending arcuately approximately 120° about a central axis on each side of the slot portion as indicated in FIG. 5.

A plurality of support assemblies is generally needed for support of an apparatus, with a corresponding plurality of apertures at locations corresponding to those of the support assemblies. Optimally there are three such supports as shown in FIGS. 2 and 4.

It has been determined that best isolation is approached where each support assembly is positioned to support one third of the weight of the apparatus, i.e., equalized supports. Isolation is further improved if the support assemblies and corresponding apertures are approximately equally spaced arcuately about a vertical axis 60 defined through the center of mass of the apparatus including the carriage assembly, with the bench member generally horizontal. This is shown in FIGS. 2 and 4 as 120° C. separations of three assemblies and corresponding apertures. Also the slots each should have a longitudinal axis 62 aligned on a radius extending from the vertical axis as shown in FIG. 4. This alignment optimizes ability to compensate for dimensional variations of the system within tolerances.

It is desirable for the support assemblies to be substantially identical, but exact machining is impractical. As described above, overfill flow of the compressed elastomer goes into the slot portions. Different compressions of the several isolation rings are to be expected from dimensional variations within normal tolerances in the fabrication of the system. Thus the ability of a mounting system according to the present invention, to allow the elastomer to flow unevenly into the legs of the slot portions to compensate for such variations, may readily be appreciated.

As further described above, overfill or flow of elastomer is along the slot portions without thickening of the rings. With a plurality of supports this is important since an uneven thickening of the several rings under slightly different compressions can result in a tilted apparatus with misalignment, and also uneven isolation from vibrations. This problem is solved with the present invention.

As an example, an assembly has a pin of diameter 0.476 cm and length 0.500 cm on a boss of 1.346cm diameter. The aperture hole diameter is 1.427 cm, and the slot portion is 1.70 cm overall length and 0.70 cm wide. The aperture is 0.528 cm deep. The isolating ring is 1.427 cm diameter and 0.488 cm thick with a 0.476 cm diameter hole. The isolating ring is desirably formed of solid urethane elastomer. The three assemblies are separated horizontally from the center of mass by about 4.5 cm, with an optical apparatus weighing about 2 kg.

The orientation of the system is not critical. Thus the system may be used sideways or even upside down. In the latter case, the carriage may hang (if the apparatus is not too heavy); or the carriage and bench members may switch roles; i.e. the pin may be affixed to the carriage.

Figure 6:
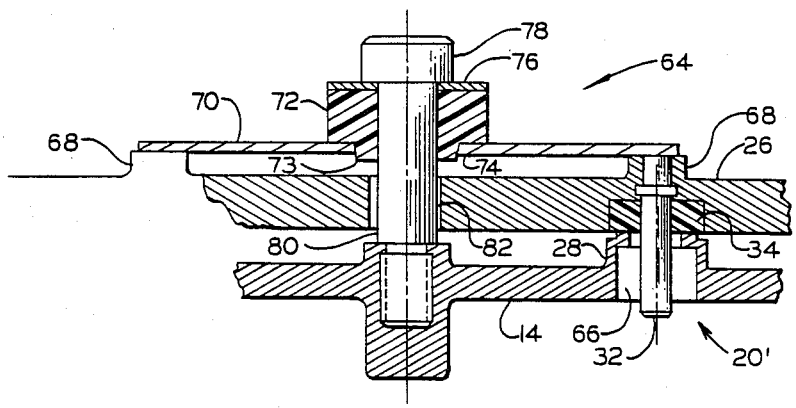
FIG. 6 is an elevation in cross section of a further embodiment of a mounting system of the present invention.

In a further embodiment, illustrated in FIG. 6, a clamping assembly 64 provides a positive retention of carriage 26 on bench member 14, without relying on isolating rings 34 to provide this function. A support assembly 20' is essentially the same as described above, except, for illustration, boss 28 is formed with a die operation leaving a cavity 66 under the boss, and pin 32 is force fitted into a hole through the boss. An upward protrusion 68 is formed on top of carriage member 26 over each support assembly, providing legs for a clamping disk 70 member made of sheet metal or the like.

Clamping assembly 64 is positioned between the support assemblies and preferably proximate the center of gravity of the apparatus. The assembly comprises a further elastomer isolation pad 72 of similar form and material to the isolating rings. Preferably the pad is dimensionally about twice the size of isolating rings 34, and has a flange 73 thereunder for insertion into a central hole 74 in disk 70, thus centering the pad. With a washer 76 on the pad, a clampdown screw 78 having a pin section 80 extending loosely through a further, oversized hole 82 in the carriage and engaged with threads 84 in the bench. Screw 78 should not directly contact the disk or the carriage. Screw 78 holds pad 72 and disk 70 in light compression over the clamping assemblies which, as explained above, are preferably three in number. It was found that this clamping embodiment retains the apparatus without interfering with absorbtion of vibrations. The clamping assembly further allows tilting of the apparatus.

Tests on an optical interferometer apparatus incorporating a mounting system having the preferable embodiments set forth herein have indicated a reduction of vibrations of at least 80%, with satisfactory maintenance of optical alignment.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A mounting system for isolating an apparatus from external vibrations, including a carriage member section of an apparatus being isolated from external vibrations, and a bench member having at least one support assembly thereon positioned to support the carriage member and thereby the apparatus;

the support assembly comprising a pin affixed perpendicularly to the bench member and an elastomer isolating ring with a central hole-press fitted onto the pin;

the carriage member having an aperture therein generally aligned with the support assembly, the aperture including a slot portion and a ring engagement portion, the ring engagement portion being defined by an outer wall, the outer wall being press fitted over the isolating ring with the slot portion being unfilled by the isolating ring wherein;

the isolating ring is retained in compression between the pin and the outer wall such that elastomer overfill of the isolating ring can expand into the slot portion sufficiently to compensate for tolerance misalignment between the support member and the aperture without substantial thickening of the isolating ring.

2. A mounting system according to claim 1 wherein the support assembly further comprises a boss protruding from the bench member, with the pin affixed to the boss, the boss having a diameter greater than that of the pin so that the isolating ring rests on the boss.

3. A mounting system according to claim 1 wherein the aperture is shaped as a slot portion superimposed centrally on a hole portion, the hole portion being defined by the outer wall and having a maximum hole dimension transverse to the slot portion with the slot portion having a width less than the hole dimension and a length greater than the hole dimension.

4. A mounting system according to claim 3 wherein the hole portion is a portion of a circular hole with the hole dimension being a hole diameter.

5. A mounting system according to claim 4 wherein the hole portion has a central axis with the outer wall extending arcuately about the central axis approximately 120° on each side of the slot portion.

6. A mounting system according to claim 1 wherein the slot portion is formed as two legs extending diametrically opposite from the ring engagement section.

7. A mounting system according to claim 1 wherein the at least one support assembly comprises a plurality of support assemblies, and the at least one aperture comprises a corresponding plurality of apertures at locations corresponding to those of the support assemblies.

8. A mounting system according to claim 7 wherein the plurality of support assemblies and the plurality of apertures each comprise three in number.

9. A mounting system according to claim 8 wherein each support assembly is positioned to support one third of the weight of the apparatus.

10. A mounting system according to claim 7 wherein with the bench member generally horizontal the apparatus has a center of mass defining a location of a vertical axis, and the slots each have a longitudinal axis aligned on a radius extending from the vertical axis.

11. A mounting system according to claim 7 wherein, with the bench member generally horizontal, the apparatus has a center of mass defining a location of a vertical axis, with the support assemblies and corresponding apertures being equally spaced arcuately about the vertical axis.

12. A mounting system according to claim 7 further including a clamping assembly disposed between the support assemblies, the clamping assembly comprising the carriage member having a first central hole therein and a respective upward protrusion on the carriage member located over each support assembly, a disk member disposed on the respective protrusions and having a second central hole therein aligned with the first central hole, an elastomer isolation pad having a third central hole therein and being retained on the disk member with the third hole aligned with the first and second holes, and a clampdown screw extending through the first, second and third holes without contacting the disk member or the carriage member, the clampdown screw engaging the bench member such as to retain the pad and the disk member in compression.

13. A mounting system according to claim 12 wherein, with the bench member generally horizontal, the apparatus has a center of mass defining a location of a vertical axis, with the support assemblies and corresponding apertures being equally spaced arcuately about the vertical axis, and the clamping assembly is disposed proximate the vertical axis.

14. A mounting system for isolating an apparatus from external vibrations, including a carriage member section of an apparatus being isolated from external vibrations, and a bench member having three support assemblies thereon each being positioned under the carriage member to support one third of the weight of the apparatus;

each support assembly comprising a boss protruding upwardly from the bench member, an upwardly oriented pin centrally affixed to the boss, and a circular elastomer isolating ring with a central hole press fitted onto the pin, the boss having a diameter greater than that of the pin so that the isolating ring rests on the boss wherein;

the carriage member has three apertures each being generally aligned with a corresponding support assembly, each aperture being shaped as a slot portion superimposed centrally on a portion of a circular hole, defined by an outer wall, the outer wall being press fitted over the isolating ring with the slot portion being unfilled by the isolating ring, the hole portion further having a diameter dimension transverse to the slot portion, the slot portion having a width less than the diameter and a length greater than the diameter with the slot portion being unfilled by the isolating ring, the hole portion further having a central axis with the outer wall extending arcuately about the central axis approximately 120° on each side of the slot portion; with the slot portion formed as two legs extending diametrically opposite from the hole portion;

the apparatus has a center of mass defining a location of a vertical axis, with the support assemblies and corresponding apertures being equally spaced arcuately about the vertical axis, and with the slot portions of each aperture having a longitudinal axis aligned on a radius extending from the vertical axis;

the isolating ring is retained in compression between the pin and the outer wall such that elastomer overfill of the isolating ring can expand into the slot portion sufficiently to compensate for tolerance misalignment between the support member and the aperture, without substantial thickening of the isolating ring.

* * * * *